United States Patent
Kotwal et al.

(10) Patent No.: US 12,456,005 B2
(45) Date of Patent: Oct. 28, 2025

(54) METHOD, COMPUTER SYSTEM AND COMPUTER PROGRAM PRODUCT FOR IMPROVED TABLE PROCESSING

(71) Applicant: MORNINGSTAR INC., Chicago, IL (US)

(72) Inventors: Vaibhav Kotwal, Navi Mumbai (IN); Swapnil Deshpande, Navi Mumbai (IN); Kartik Yadav, Navi Mumbai (IN); Tushar Gawade, Navi Mumbai (IN); Sule Nikhil, Navi Mumbai (IN); Ahmad Shariq, Chicago, IL (US)

(*) Notice: Subject to any disclaimer, the term of this patent is extended or adjusted under 35 U.S.C. 154(b) by 305 days.

(21) Appl. No.: 18/001,690

(22) PCT Filed: Jun. 18, 2021

(86) PCT No.: PCT/US2021/037998
§ 371 (c)(1),
(2) Date: Dec. 13, 2022

(87) PCT Pub. No.: WO2021/257939
PCT Pub. Date: Dec. 23, 2021

(65) Prior Publication Data
US 2023/0252231 A1    Aug. 10, 2023

(30) Foreign Application Priority Data

Jun. 18, 2020 (EP) .................................. 20180937

(51) Int. Cl.
*G06F 40/00* (2020.01)
*G06F 40/177* (2020.01)
(Continued)

(52) U.S. Cl.
CPC .......... *G06F 40/177* (2020.01); *G06F 40/205* (2020.01); *G06V 10/82* (2022.01);
(Continued)

(58) Field of Classification Search
CPC .... G06F 40/177; G06F 40/205; G06F 40/216; G06V 10/82; G06V 30/1448; G06V 30/19147; G06V 30/1916; G06V 30/412
See application file for complete search history.

(56) References Cited

U.S. PATENT DOCUMENTS

2014/0270347 A1*  9/2014  Xu ................... G06F 18/24323
                                                         382/199
2020/0089946 A1*  3/2020  Mallick ............... G06V 30/416

FOREIGN PATENT DOCUMENTS

| JP | 2006209649 A | 8/2006 |
| JP | 2019082814 A | 5/2019 |
| WO | 2021/257939 A9 | 12/2021 |

OTHER PUBLICATIONS

Li et al, TableBank: Table Benchmark for Image-based Table Detection and Recognition, Proceedings of the 12th Conference on Language Resources and Evaluation (LREC 2020), pp. 1918-1925 (Year: 2020).*

(Continued)

*Primary Examiner* — Xiao Liu
(74) *Attorney, Agent, or Firm* — Vorys, Sater, Seymour and Pease, LLP

(57) ABSTRACT

In a first aspect, the invention pertains to a computer-implemented method for improved grid-less table processing. In a second and third aspect, the invention pertains to a computer system and a computer program product for improved grid-less table processing. In a fourth aspect, the invention pertains use of any of the method, system or product for document parsing.

13 Claims, 13 Drawing Sheets

(51) Int. Cl.
  *G06F 40/205* (2020.01)
  *G06V 10/82* (2022.01)
  *G06V 30/14* (2022.01)
  *G06V 30/19* (2022.01)
  *G06V 30/412* (2022.01)

(52) U.S. Cl.
  CPC .... *G06V 30/1448* (2022.01); *G06V 30/19147* (2022.01); *G06V 30/1916* (2022.01); *G06V 30/412* (2022.01)

(56) References Cited

OTHER PUBLICATIONS

Vine et al, Identifying Table Structure in Documents using Conditional Generative Adversarial Networks, arXiv:2001.05853v1 (Year: 2020).*
Arif et al, Table Detection in Document Images using Foreground and Background Features, Digital Image Computing: Techniques and Applications (DICTA) (Year: 2018).*
ISR-WO for parent application PCT/US2021/037998 (WO/2021/257939) dated Oct. 5, 2021.
Nataliya Le Vine et al, "Identifying Table Structure in Documents using Conditional Generative Adversarial Networks", arxiv.org, Cornell University Library, 201 Olin Library Cornell University Ithaca, NY 14853, Jan. 13, 2020 (Jan. 13, 2020), XP081580115.
Minghao Li et al, "TableBank: Table Benchmark for Image-based Table Detection and Recognition", arxiv.org, Cornell University Library, 201 Olin Library Cornell University Ithaca, NY 14853, Mar. 5, 2019 (Mar. 5, 2019), XP081129653.
A Sakila et al, "Image Enhancement using Morphological Operations", International Journal of Recent Research in Science, Engineering and Technology, vol. 3, No. 2, Apr. 15, 2017 (Apr. 15, 2017), p. 685-698, XP055744061.
Siavash Arjomand Bigdeli et al, "Image Restoration using Autoencoding Priors", arxiv.org, Cornell University Library, 201 Olin Library Cornell University Ithaca, NY 14853, Mar. 29, 2017 (Mar. 29, 2017), XP080752870.
Zhao Guoping et al, "Skip-Connected Deep Convolutional Autoencoder for Restoration of Document Images", 2018 24th International Conference on Pattern Recognition (ICPR), IEEE, Aug. 20, 2018 (Aug. 20, 2018), p. 2935-2940, XP033459845.
Schreiber S., et al., DeepDeSRT: Deep Learning for Detection and Structure Recognition of Tables in Document Images, 2017 14th IAPR International Conference on Document Analysis and Recognition (ICDAR), Kyoto, Japan, 2017, pp. 1162-1167.

* cited by examiner

| Particulars | Standalone | | Consolidated | |
|---|---|---|---|---|
| | 1/03/2018 | 1/03/2017 | 1/03/2018 | 31/03/2017 |
| Revenue from operations | 34209 | 9098.23 | 8250.68 | 21911.33 |
| Other Income | 87.61 | 72.06 | 41.69 | >7243 |
| Total Income | 488.77 | 8870.35 | 8462.58 | 22483.74 |
| Profit (Loss) Before | | | | |
| Depreciation, Finance Cost, Exceptional Items, Extraordinary Items & Tax | 7465204)* | 27151.97) | 74899.39* | 2856180) |
| Less: Depreciation and Finance Cost | 775.21 | 4361.35 | 184.14 | 6065.21 |
| Less: Exceptional Items/ Extraordinary Items | | | | |
| Profit (Loss) Before Taxation Provisions | 80337.25) | 41513.33)* | 82082.52) | 38523.01) |
| Less Tax | 366.24) | 721.57) | 80.54) | 654.44) |
| Profit / (Loss) After Tax | 78671.01) | 40311.75) | 8200298) | 3982301) |
| Balance Carried to | | | | |
| | 78671.01) | 40311.75)* | 8200298) | 39820.01) |
| Balance Sheet | | | | |
| Earnings per Share | (8.11) | 9.24) | 18.57) | 8.82) |

METHOD, COMPUTER SYSTEM AND COMPUTER PROGRAM PRODUCT FOR IMPROVED TABLE PROCESSING

FIELD OF THE INVENTION

The present invention pertains to a method, system and computer program product for improved table processing, as well as use thereof for document parsing.

BACKGROUND

Methods, systems and computer program products for processing tables are known in the state of the art.

Such table processing is particularly useful for document parsing of fixed-layout documents such as PDF documents. Parsing tables from PDF documents in an image or non-image form can be a challenging task. Various open source and licensed PDF parsing tools available in the market struggle to process tables accurately.

Tables without grids that separate columns and rows, i.e. grid-less tables, are especially challenging for parsing tools. Documents comprising such grid-less tables are often referred to in literature as semi-structured documents. These documents are challenging for parsing tools, as existing tools comprise poor auto detection technology. As a result, an analyst has to manually select and extract tables when parsing a document. Furthermore, existing parsing tools are unable to extract data or information comprised in multiple row lines or merged cells inside a table.

US 2020 0 089 946 describes a tool for extracting tabular data from electronic documents. This tool generates information of a grid structure of tabular data. This grid structure is combined with text associated with the tabular data to obtain a gridded table. The inventors note that the US '946 provided tool is inaccurate, especially when generating grids for tables only comprising horizontal or vertical lines. Moreover, this tool does not work when generating grids for grid-less tables.

There remains a need in the art for improved processing of tables and especially grid-less tables, as well as improved parsing of documents comprising these tables.

The invention aims to resolve at least some of the technical problems associated with methods, systems and computer program products known in the art.

SUMMARY OF THE INVENTION

In a first aspect, the invention pertains to a method for grid-less table processing according to claim 1.

In a second aspect, the present invention pertains to a computer system for grid-less table processing according to claim 12.

In third aspect, the invention pertains to a computer program product for grid-less table processing according to claim 13.

In fourth aspect, the invention pertains to a use of any of the method, system or computer program product for document parsing.

The invention is advantageous as it allows for an easy and accurate processing of grid-less tables. As an extension thereof, semi-structured documents comprising such grid-less tables are more easily parsed. Further advantages of the invention are discussed hereafter throughout the description, examples and figures.

Preferred embodiments of the invention are discussed in claims 2 to 12, as well as throughout the description, examples and figures.

DESCRIPTION OF FIGURES

FIGS. 2 to 4 illustrate localization prediction of a grid-less table in a document using a deep learning model, specifically a convolutional neural network.

FIGS. 5 to 10 illustrate table grid prediction for an extracted grid-less table using a generative adversarial network, specifically a conditional GAN.

Figure 11:
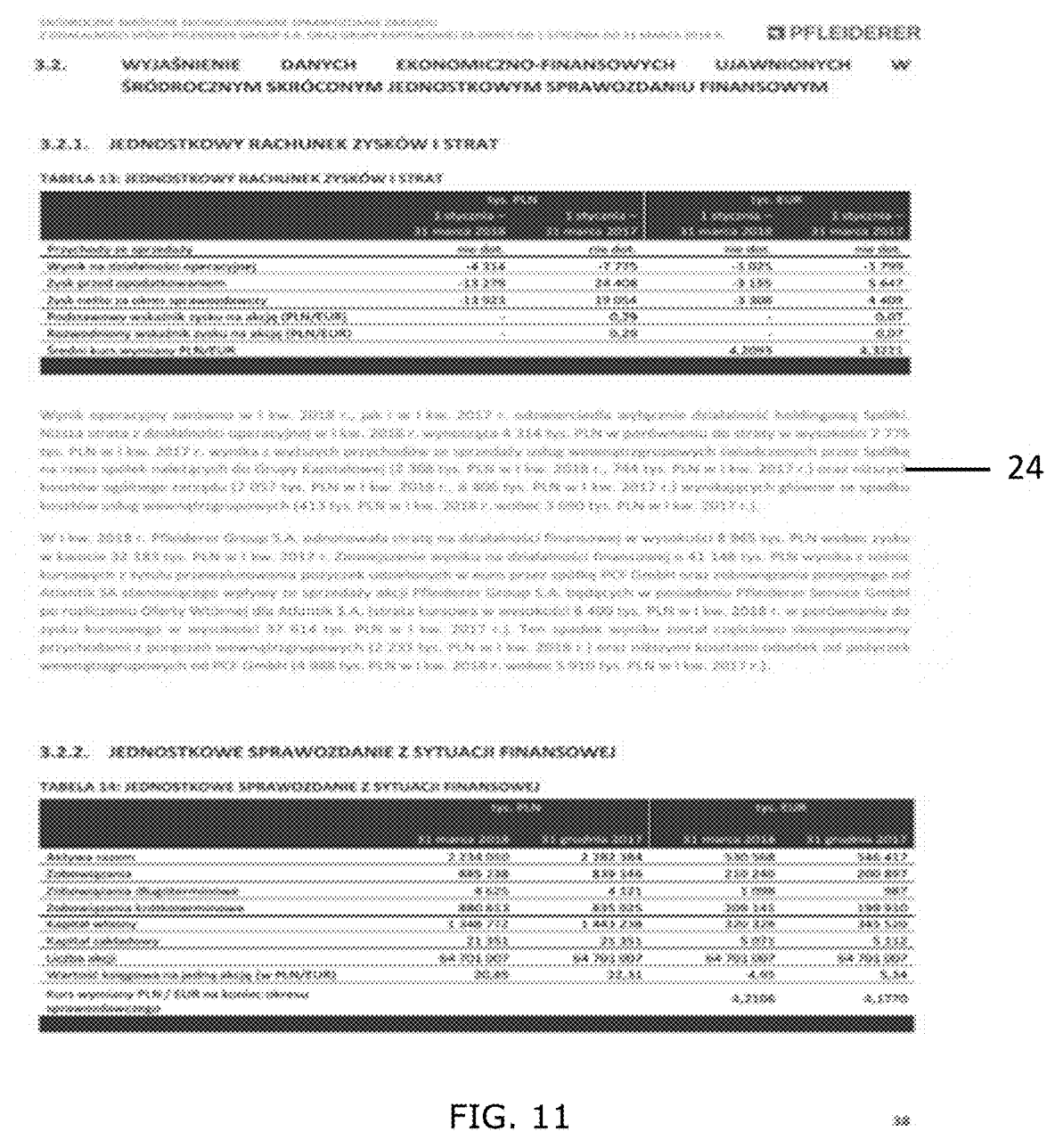
Figure 12:
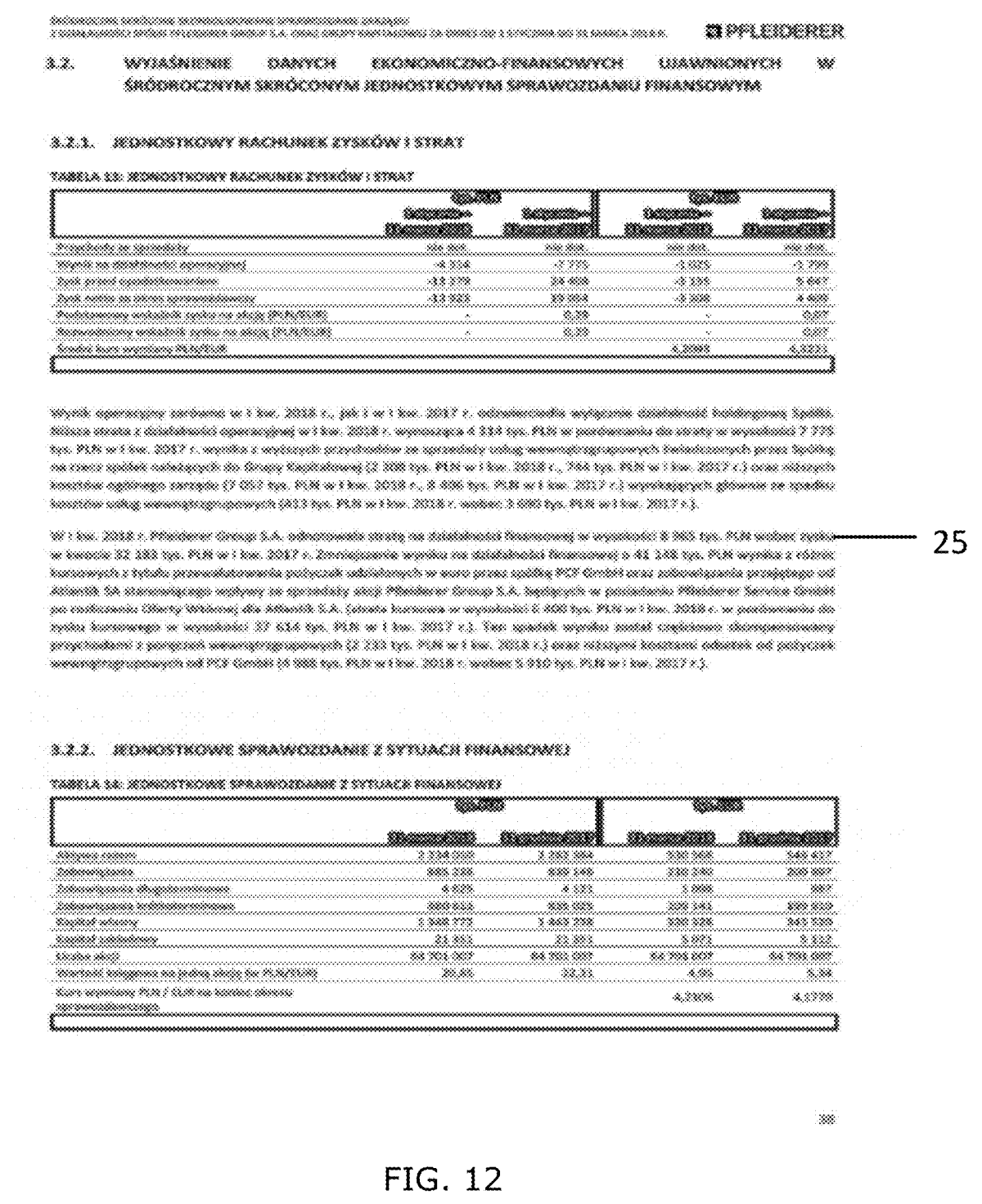

FIGS. 11 to 15 illustrate preferred image processing steps prior and after dilation, for improved processing of grid-less tables.

DETAILED DESCRIPTION OF THE INVENTION

Figure 1:
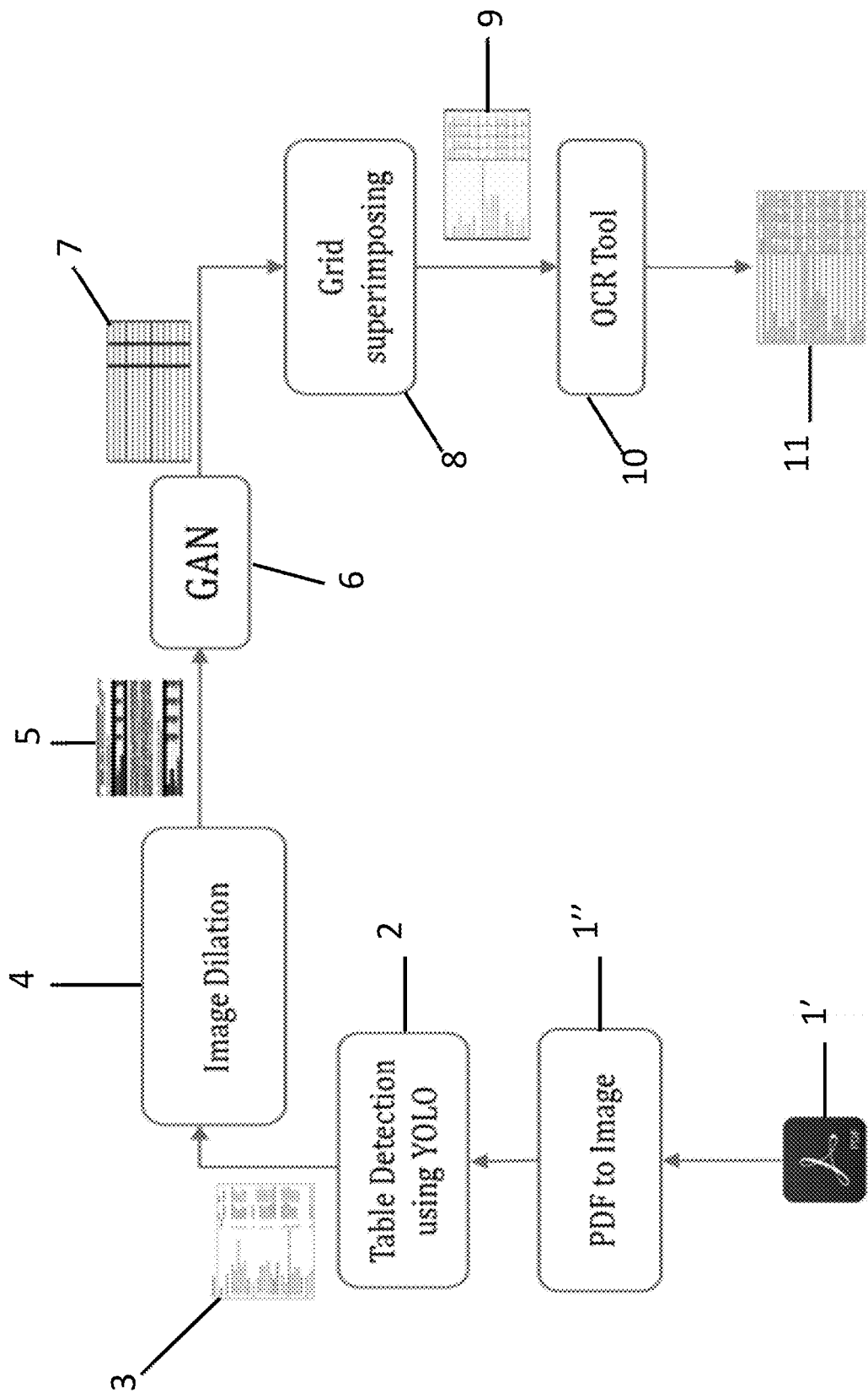
FIG. 1 shows a schematic overview of an overall workflow of the invention, comprising processing of grid-less tables and documents associated therewith.

The invention pertains to a computer-implemented method, computer system and a computer program product for improved grid-less table processing, as well as use of any of the method, system or product for document parsing. In what follows, the invention will be described in detail, preferred embodiments are discussed, and the invention will be illustrated by means of non-limitative examples.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention. As used herein, the following terms have the following meanings:

"A," "an," and "the" as used herein refers to both singular and plural referents unless the context clearly dictates otherwise. By way of example, "a compartment" refers to one or more than one compartment.

"Comprise," "comprising," and "comprises" and "comprised of" as used herein are synonymous with "include," "including," "includes" or "contain," "containing," "contains" and are inclusive or open-ended terms that specifies the presence of what follows e.g. component and do not exclude or preclude the presence of additional, non-recited features, element, steps, known in the art or disclosed therein.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. The terms or definitions used herein are provided solely to aid in the understanding of the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments of the invention described herein are capable of operation in other sequences than described or illustrated herein.

In a first aspect, the invention relates to a computer-implemented method for improved table processing. The method preferably comprising the step of providing a fixed-layout electronic document comprising a grid-less table. The method preferably comprising the step of training a deep learning model (DLM) on training data relating to a plurality of training-related electronic documents. Preferably, each of the plurality of training-related electronic documents comprising a grid-less training table and a label associated thereto indicative of a bounding box of the training table. The method preferably comprising the step of determining a bounding box for the grid-less table in said fixed-layout electronic document by means of the trained DLM. The method preferably comprising the step of extracting an image of the grid-less table from said fixed-layout electronic document based on the determined bounding box. The method preferably comprising the step of processing the extracted image by at least performing a dilation step. The method preferably comprising the step of training a conditional generative adversarial network (cGAN) comprising a generator neural network (GNN) and a discriminator neural network (DNN). Preferably, wherein the cGAN is trained on training data comprising a set of real pairs. Preferably, wherein each of said set of real pairs comprises a training-related dilated grid-less table image and corresponding table grid image. Preferably, wherein training of the cGAN comprises a plurality of training steps. Preferably, wherein each of said training steps comprising one of steps a) or b), and step c):
  a) providing, to the DNN, a real pair obtained from the set of real pairs;
  b) providing, to the DNN, a generated pair comprising a candidate fake grid image and a corresponding training-related dilated grid-less table image obtained from the set of real pairs, wherein the candidate fake grid image is obtained by modifying, by the GNN, the corresponding training-related dilated grid-less table image using a random data vector;
  c) determining, by the DNN, an indication of whether the to the DNN provided real or generated pair is a by the GNN generated pair.
Preferably, wherein training of the cGAN comprises a plurality of GNN and DNN iterative training cycles. Preferably, wherein each of said plurality of GNN and DNN iterative training cycles comprising at least one of said plurality of training steps. Preferably, wherein during each training cycle a respective GNN or DNN associated loss function is minimized until an associated stability cycle predicate is met. Preferably, wherein the cGAN is trained by minimizing a combined loss of the GNN and DNN associated loss functions until a combined loss stability predicate is met. The method preferably further comprising the step of determining a table grid image for the processed extracted image by means of the trained GNN comprised by the trained cGAN. The method preferably further comprising the step of combining the determined table grid image and the grid-less table from the provided fixed-layout electronic document in a gridded image of the grid-less table.

In a second aspect, the invention relates to a computer system for improved table processing. Preferably, wherein the computer system is configured for performing the computer-implemented method according to the first aspect of the invention. In a third aspect, the invention relates to a computer program product for improved table processing. Preferably, wherein the computer program product comprises instructions which, when the computer program product is executed by a computer, cause the computer to carry out the computer-implemented method according to the first aspect of the invention. Preferably, wherein the computer is the computer system according to the second aspect of the invention.

In a fourth aspect, the invention relates to a use of the computer-implemented method for improved table processing the first aspect of the invention, the computer system according to the second aspect of the invention, or the computer program product according to the third aspect of the invention, for generating a parsed document from the fixed-layout electronic document.

The invention provides a computer-implemented method, a computer system and a computer program product for improved table processing, as well a use of any of the method, system or product for generating a parsed document from the fixed-layout electronic document. A person having ordinary skill in the art will appreciate that the method is implemented in the computer program product and executed using the computer system. It is also clear for a person having ordinary skill in the art that improved table processing can be used for parsing tables from documents. In what follows, the four aspects of the present invention are therefore treated together.

The subject of the invention is to improve table processing, and in particular to improve processing of a grid-less table. Although the provided solution is able to improve processing of any table, comprising or lacking any grid structure known in the art, the invention is particularly aimed at the improved processing of grid-less tables. Such tables are particularly hard to detect in electronic fixed-layout documents. Furthermore, information such as hierarchy contained therein is hard to extract. The subject of the invention therefore more particularly aims at providing a method, system and computer program product to conveniently, efficiently and reliably extract tabular data from electronic documents while maintaining a format and structure (or hierarchy) thereof. Improved processing according to the present invention of grid-less tables can advantageously be used in different fields, such as digital character extraction (DCE), image enhancement, optical character recognition (OCR), document layout analysis, field detection, field parsing, etc.

The subject of the invention is to generate a parsed document from the fixed-layout electronic document. In this regard, the determined table grid image and the grid-less table from the provided fixed-layout electronic document are combined in a gridded image of the grid-less table. This simple gridded image of the grid-less table may or may not be provided in a separate image. This gridded image of the grid-less table may or may not be superimposed on the fixed-layout electronic document or an image thereof. Preferably, generating a parsed document from the fixed-layout electronic document comprises the step of performing OCR of text associated with tabular data from the gridded image of the grid-less table.

"Parsing," as used herein, refers to a term known in the state of the art, that should preferably be understood as analysing and/or separating a data-stream, e.g. a fixed-layout electronic document, into more easily processable components. This aims at facilitating performing some kind of transformation, e.g. OCR, on the data-stream.

"Tabular data," as used herein, refers to a term known in the state of the art, that should preferably be understood as any representation of data in a form of a proper and well-defined format and structure (or hierarchy), in order to enhance visual representation, interpretation and extraction of the data. Tabular data helps in maintaining the hierarchy of the data, as well as enables classification of the data represented therein. Tabular data can include structured data arrangements like a grid structure, a table, etc. In the case of a grid-less table, the structured data arrangements are invisible. Optionally, the tabular data can comprise a flowchart.

"Electronic document," as used herein, refers to a term known in the state of the art, that should preferably be understood as any electronic media that can comprise one or more forms of content therein. Such electronic document can exist in different formats, such as, a Portable Document Format file (having .PDF extension), a document generated using a word-processing software (such as, a file having .doc or .docx extension), a web text document (.HTML or .htm extension), adobe postscript document (.ps extension), etc. Furthermore, the electronic document may or may not comprise different forms of content, e.g. unstructured data arrangements such as textual data, images, etc., and structured data arrangements such as tabular data, histogram, etc. Moreover, the electronic document may or may not comprise a single tabular data (such as a single table) or a plurality of the tabular data.

"Fixed-layout electronic document," as used herein, refers to a term known in the state of the art, that should preferably be understood as any electronic media that can comprise one or more forms of content therein and wherein the one or more forms of content have a fixed layout. Such fixed-layout electronic document can exist in different formats, such as, a searchable or non-searchable Portable Document Format file (having .PDF extension), a bitmap file (having .bmp extension), a portable network graphic file (having a .png extension), a joint photographic experts group file (having a .jpeg extension), a tagged image file format (having a .tiff extension), and so forth. Preferably, the fixed-layout electronic document is a PDF document, short pdf. Such PDF is widely used and enables easy communication (such as transmission and receipt) of the tabular data between different individuals, as well as convenient interpretation and extraction of the information from the tabular data. However, when the tabular data is required to be extracted from a pdf, such as by copying the tabular data from the pdf, the tabular data loses the format and structure (or hierarchy) thereof, thereby making the extracted data useless.

For extracting an image of the grid-less table from a provided fixed-layout electronic document, a simple embodiment of the present invention provides training a deep learning model (DLM) on training data relating to a plurality of training-related electronic documents. Preferably, wherein each of said plurality of training-related electronic documents comprises a grid-less training table and a label associated thereto indicative of a bounding box of the training table.

Beneficially, the invention allows automatic detection of the tabular data from the electronic document, thereby, alleviating problems associated with manual selection of the tabular data by a user. Thus, a time and effort required for the manual selection of the data can be reduced, thereby increasing an efficiency of the user. Furthermore, the invention allows extraction of grid-less tables from the fixed-layout electronic documents such that a hierarchy of the tabular data is maintained subsequent to extraction. It will be appreciated that maintaining hierarchy of the tabular data subsequent to the extraction enables to maintain an integrity of information represented within the tabular data, thereby enabling convenient, reliable and efficient extraction and interpretation of the tabular data.

"Deep-learning," as used herein, refers to a term known in the state of the art, that should preferably be understood as machine learning techniques that comprise networks (such as, artificial neural networks (ANN), recurrent neural networks (RNN), convolutional neural networks (CNN), and so forth) of nodes (such as artificial neurons) capable of semi-supervised learning or supervised learning from sample electronic documents comprising various forms of tabular data therein. In such an instance, the DLM can be trained to detect the location of the tabular data within the electronic document, such as, by providing a plurality of training-related sample electronic documents comprising a grid-less training table and a label associated thereto indicative of a bounding box of the training table.

"Bounding box," as used herein, refers to a term known in the state of the art, that should preferably be understood as a rectangular shape that is generated on an area of the electronic document comprising the grid-less table and wherein the generated rectangular shape completely encompasses the grid-less table. It will be appreciated that the area of a single generated bounding box corresponds to a total area of a page of an electronic document covered by a single tabular data. For example, the area of the single bounding box can correspond to an area of a page of an electronic document if a given tabular data is represented to completely cover the page of the electronic document. However, most tabular data will generally cover smaller areas within pages of electronic documents, such as, areas within 50% of pages of the electronic document. Optionally, the area of the single bounding box can extend to multiple pages if a single tabular data exists on multiple pages of the electronic document. In such an instance, the generated bounding box will correspond to an area bigger than the total area of each page of the electronic document.

Preferably, a bounding box comprises a coordinate corresponding to a vertex of the bounding box and a coordinate corresponding to width and height of the bounding box. Accordingly, a bounding box may comprise the coordinates: tx; ty; tw; th. Alternatively, a bounding box comprises a coordinate corresponding to each of the vertices of the bounding box. Accordingly, a bounding box may comprise the coordinates: (tx1, ty1); (tx2, ty2); (tx3, ty3); (tx4, ty4).

For extracting an image of the grid-less table from a provided fixed-layout electronic document, a simple embodiment of the present invention furthermore provides extracting an image of the grid-less table from said fixed-layout electronic document based on the determined bounding box. Preferably, the extracted image corresponds to an image the area within the bounding box of the fixed-layout electronic document. The extracted image may or may not be associated with one or more image file-formats, including but not limited to, .jpg, .png, .bmp, .gif, etc.

Preferably, the plurality of training-related electronic documents, each comprising a grid-less training table and a label associated thereto indicative of a bounding box of the training table, are obtained by:
    providing a plurality of DLM training-related fixed-layout electronic documents, each comprising a grid-less table, wherein said plurality of DLM training-related fixed-layout electronic documents are convertible to a mark-up language;
    converting the plurality of training-related fixed-layout electronic documents to corresponding documents in the mark-up language;
    identifying, in each of the corresponding mark-up language documents, a table tag associated to the grid-less table of the associated training-related fixed-layout electronic document; and
    associating a label, to each of the plurality of training-related fixed-layout electronic documents, for the bounding box of the grid-less table, wherein said label is based at least in part on the corresponding identified table tag.

According to a preferred embodiment, the plurality of training-related electronic documents, each comprising a grid-less training table and a label associated thereto indicative of a bounding box of the training table, are obtained by:
    providing a plurality of PDF documents, each comprising a grid-less table;
    converting the plurality of PDF documents to HTML documents;
    identifying, in each of the HTML documents, a table tag associated to the grid-less table of the associated PDF document; and
    associating a label, to each of the plurality of PDF documents, for the bounding box of the grid-less table, wherein said label is based at least in part on the corresponding identified table tag.

"Mark-up language," as used herein, refers to a term known in the state of the art, that should preferably be understood as a file format suitable for annotating a document in a way that is syntactically distinguishable from a corresponding text, meaning when the document is processed for display, the mark-up language is not shown, and is used to format the corresponding text. The use of a mark-up language may or may not necessarily be limited to formatting the corresponding text. A mark-up language may or may not comprises additional functionalities. Examples of mark-up languages include the following file formats troll, nroff, TeX, Scribe, GML, SGML, HTML, XML, XHTML, other XML-based applications, etc. Use of a mark-up language to obtain to table tags is easy to implement and provides qualitative information regarding of a position of a (grid-less) table in an electronic document. From this position information, a bounding box for a (grid-less) table is easily derived. Preferably, HTML is used as mark-up language. HTML is widely used.

Preferably, the DLM for determining a bounding box for the grid-less table in the fixed-layout electronic document, is one or more of an artificial neural network (ANN), a recurrent neural network (RNN) or a convolutional neural network (CNN).

According to a preferred embodiment, the DLM is a CNN. Different DLM architectures are trainable to determine a bounding box for the grid-less table in a fixed-layout electronic document. Most techniques are, however, not robust to extreme viewpoint and background variations. CNNs are known to be extremely robust to variations in background and viewpoint in object detection and classification tasks, making them very suitable for determining bounding boxes of grid-less table in fixed-layout electronic documents with a variable layout, such as scientific publications, etc.

Preferably, a loss function associated to training the DLM for determining a bounding box for the grid-less table in the fixed-layout electronic document is at least based in part on an Intersection Over Union (IOU) loss function. IOU can be computed as Area of Intersection divided over Area of Union of two boxes. IOU must be between $\geq 0$ and $\leq 1$. To be able to predict bounding boxes, we need the IOU to be between the predicted bounding box and the ground truth bounding box which is approximately 1. More preferably, a loss function associated to training the DLM for determining a bounding box for the grid-less table in the fixed-layout electronic document is at least based in part on a Binary Cross Entropy (BCE) loss function.

The by the CNN extracted image is processed according to a simple embodiment of the invention. Preferably, the processing of the by the CNN extracted image comprises at least performing a dilation step. Performing dilation on the extracted image associates the objects, e.g. grid-less textual information, present in the grid-less tables with required and/or uniform pixel density.

It will be appreciated that by performing such morphological dilation of objects in grid-less tables, such that said objects have a uniform pixel density, complications associated with processing said objects having varying pixel densities are reduced.

"Morphological operation," as used herein, refers to a term known in the state of the art, that should preferably be understood as an image processing technique wherein pixels of an image are manipulated based on shapes of objects represented in the image. Furthermore, the morphological operation employs a structural element, e.g. a sliding window, that is used to detect the shapes of the objects and subsequently, pixels associated with the detected objects can be manipulated. "Structural element," as used herein, refers to a term known in the state of the art, that should preferably be understood as a template having a predefined shape, e.g. rectangular, that is used for performing the morphological operation.

"Dilation" or "morphological dilation," as used herein, refers to a term known in the state of the art, that should preferably be understood as an operation wherein pixels are added to a boundary of objects detected within an image.

According to a preferred embodiment, processing the by the DLM extracted image further comprises, prior to said dilation step, the steps of:
    converting the extracted image into a greyscale image; and
    applying thresholding to the greyscale image by means of an adaptive Gaussian technique;
wherein said dilation step is performed on said thresholded greyscale image.

According to a preferred embodiment, processing the extracted image further comprises, after said dilation step, the steps of:
  obtaining outlines of dilated objects in the by said dilation step dilated image;
  dilating the outline comprising image; and
  applying thresholding to the dilated outline comprising image by means of an adaptive Gaussian technique.

According to an especially preferred embodiment, processing the extracted image comprises the steps of:
  converting the extracted image into a greyscale image;
  applying thresholding to the greyscale image by means of an adaptive Gaussian technique;
  dilating the thresholded greyscale image;
  obtaining outlines of dilated objects in the dilated thresholded greyscale image;
  dilating the outline comprising image; and
  applying thresholding to the dilated outline comprising image by means of an adaptive Gaussian technique.

"Greyscale image," as used herein, refers to a term known in the state of the art, that should preferably be understood as a monochromatic image comprising pixels having different shades of grey colour. It will be appreciated that the different shades of grey colour are formed by combinations of black and white colours in varied proportions, for example, such as a dark shade of grey colour in which the black colour is in maximum proportion while the white colour is in minimum proportion, and a light shade of grey colour in which black colour is in minimum proportion while white colour is in maximum proportion. Such conversion of the extracted image into the greyscale image minimizes complications that may arise during processing of colour images, such as, by employing computer vision-based image processing techniques, e.g. morphological operations such as dilation and erosion. Greyscale images are also associated with a less pixel information of the image compared to RGB (red, green, and blue) images, conversion of the received image to the greyscale image further aids in processing, such as faster processing thereof.

"Thresholding," as used herein, refers to a term known in the state of the art, that should preferably be understood as classifying pixels of an image, for example a greyscale image, into two groups to obtain a binary image having only two colours therein, wherein the pixels are classified based on a threshold intensity value. The pixels having the intensity less than the threshold intensity value (such as, pixels associated with light shades of grey) are classified into a first group and the pixels having the intensity more than the threshold intensity value (such as, pixels associated with dark shades of grey) are classified into a second group. As a result, the greyscale image having pixels of various shades of grey will be converted into a thresholded greyscale image having pixels with only black colour and white colour respectively, wherein the pixels having the black colour correspond to pixels of the greyscale image for all intensity values less than the threshold intensity value and the pixels having the white colour correspond to pixels of the greyscale image for all intensity values more than the threshold intensity value. Furthermore, performing the thresholding of an image, e.g. a greyscale image, segments the thresholded greyscale image, such that a background of the thresholded greyscale image associated with blank space, is separated from a foreground of the thresholded greyscale image associated with text and grid structure of the tabular data.

"Adaptive Gaussian technique," as used herein, refers to a term known in the state of the art, that should preferably be understood as a thresholding technique that employs intensity values of pixels proximate to a given pixel (such as neighbouring pixels), to classify the given pixel into the first group or the second group. Furthermore, the adaptive Gaussian technique considers a weighted sum of intensity values of pixels proximate to the given pixel and the distance of the proximate pixels from the given pixel, to classify the given pixel into the first group or the second group. Moreover, the adaptive Gaussian technique segments an image, e.g. greyscale image, into a plurality of sub-images based on variations in the image, e.g. greyscale image, (such as, based on variations in the background of the greyscale image) and subsequently, considers dynamic threshold intensity values for each sub-image, based on the weighted mean of intensity values of pixels proximate to a given pixel within the sub-image and a constant value. It will be appreciated that performing the thresholding of an image, e.g. greyscale image, by considering the dynamic threshold intensity values, i.e. employing adaptive Gaussian technique, enables to improve clarity and accuracy associated with the thresholded image.

According to a preferred embodiment, processing the by the DLM extracted image further comprises, after at least said dilation step, an erosion step. Most preferably, processing the by the DLM extracted image further comprises, after each performed dilation step, an erosion step.

"Erosion" or "morphological erosion," as used herein, refers to a term known in the state of the art, that should preferably be understood as an operation in which pixels are removed from the boundary of objects detected within an image, such as, by removing an outermost layer of pixels associated with objects within the image. By subsequently morphologically dilating and eroding objects in a grid-less table image, complications associated with processing said objects are further reduced.

For determining a table grid image for the by the DLM processed extracted image, a simple embodiment of the present invention further provides training a conditional generative adversarial network (cGAN) comprising a generator neural network (GNN) and a discriminator neural network (DNN).

Generative adversarial networks (GANs) are a branch of unsupervised machine learning, and is implemented by a system of two neural networks, i.e. GNN and DNN, competing against each other in a zero-sum game framework. The two neural networks are created and learning is performed (i.e., the networks are trained) through their mutual competition. The first neural network is implemented as generator system, and is referred to as generator neural network (GNN). The second neural network is implemented as discriminator system, and is referred to as discriminator neural network (DNN). The GNN begins with a random input and attempts to generate synthetic or fake images. The DNN receives real authentic images, along with the synthetic images from the GNN. Accordingly, the DNN outputs a binary decision indicating a prediction as to whether the image received from the GNN is real or synthetic (i.e., fake). As the DNN improves at distinguishing between real image and synthetic images, the GNN improves at generating images to fool the DNN. The GNN and DNN are iteratively trained by minimizing a respective associated loss function. Equilibrium is for example reached when the GNN can no longer fool the DNN. No domain knowledge needs to be explicitly included. Image features are learned automatically. The loss function for the GNN is learned and not predefined. In conditional GANs (CGANs), instead of generating a sample from a random input, the GNN generates an output image conditioned on an input image. Such a system can then be trained to learn mappings from the input image space to the output or generated image space. The training process consists in learning the optimal set of values of a plurality of parameters that determine the mapping. In other words, the mapping can be thought of as a functional mapping with parameters that are adjustable, and are learned based on a set of training samples.

Preferably, the cGAN is a pixel to pixel (pix2pix) GAN. The pix2pix model is a type of cGAN where the generation of the output image is conditional on input, in this case, a processed, i.e. dilated, image of the by the DLM extracted image. The DNN is provided both with such processed image and the target image and must determine whether the target is a plausible transformation of the processed image. The GNN is trained via adversarial loss, which encourages the GNN to generate plausible images in the target domain. The GNN is also updated via L1 loss measured between the generated image and the expected output image. This additional loss encourages the GNN model to create plausible translations of the source image. More preferably, wherein the GNN of the pix2pix GAN is a CNN. Even more preferably, wherein the GNN of the pix2pix GAN is a CNN comprising a U-net architecture. U-net is a CNN architecture for fast and precise segmentation of images.

Preferably, the cGAN is trained on training data comprising a set of real pairs. Preferably, wherein each set of said set of real pairs comprising a training-related dilated grid-less table image and corresponding table grid image. Preferably, wherein training of the cGAN comprises a plurality of training steps. Preferably, wherein each of said training steps comprising one of steps a) or b), and step c):
  a) providing, to the DNN, a real pair obtained from the set of real pairs;
  b) providing, to the DNN, a generated pair comprising a candidate fake grid image and a corresponding training-related dilated grid-less table image obtained from the set of real pairs, wherein the candidate fake grid image is obtained by modifying, by the GNN, the corresponding training-related dilated grid-less table image using a random data vector;
  c) determining, by the DNN, an indication of whether the to the DNN provided real or generated pair is a by the GNN generated pair.

Preferably, wherein training of the cGAN comprises a plurality of GNN and DNN iterative training cycles. Preferably, wherein each of said plurality of GNN and DNN iterative training cycles comprising at least one of said plurality of training steps. Preferably, wherein during each training cycle a respective GNN or DNN associated loss function is minimized until an associated stability cycle predicate is met. Preferably, wherein the cGAN is trained by minimizing a combined loss of the GNN and DNN associated loss functions until a combined loss stability predicate is met.

Preferably, each of the training-related dilated grid-less table images of said set of real pairs, are obtained by dilating a grid-less table image.

Similarly, to the by the DLM extracted image, as discussed hereabove, performance of the invention is improved, specifically cGAN performance, when the training-related dilated grid-less table images are obtained as outlined hereafter.

More preferably, each of the training-related dilated grid-less table images of said set of real pairs, are obtained by:
  converting a grid-less table image into a greyscale image;
  applying thresholding to the greyscale image by means of an adaptive Gaussian technique; and
  dilating the thresholded greyscale image.

Even more preferably, each of the training-related dilated grid-less table images of said set of real pairs, are obtained by:
  converting a grid-less table image into a greyscale image;
  applying thresholding to the greyscale image by means of an adaptive Gaussian technique;
  dilating the thresholded greyscale image;
  obtaining outlines of dilated objects in the dilated thresholded greyscale image;
  dilating the outline comprising image; and
  applying thresholding to the dilated outline comprising image by means of an adaptive Gaussian technique.

Preferably, the set of real pairs, each comprising a training-related dilated grid-less table image and corresponding table grid image, are obtained by:
  providing a plurality of cGAN training-related fixed-layout electronic documents, each comprising a grid-less table, wherein said plurality of cGAN training-related fixed-layout electronic documents are convertible to a mark-up language;
  converting the plurality of training-related fixed-layout electronic documents to corresponding documents in the mark-up language;
  identifying, in each of the corresponding mark-up language documents, a table tag associated to the grid-less table of the associated training-related fixed-layout electronic document; and
  determining, for each of the grid-less tables, a table grid image based at least in part on the corresponding identified table tag;
  obtaining, from each of said plurality of cGAN training-related fixed-layout electronic documents, an image of the grid-less table; and
  dilating each of the obtained images of the grid-less tables.

More preferably, the image of the grid-less table is obtained, from each of said provided pdf documents, by:
  determining a bounding box for the grid-less table in each of the cGAN training-related fixed-layout electronic documents by means of the trained DLM; and
  extracting, from each of said cGAN training-related fixed-layout electronic documents, an image of the grid-less table based on the determined corresponding bounding box.

According to a preferred embodiment, the set of real pairs, each comprising a training-related dilated grid-less table image and corresponding table grid image, are obtained by:
  providing a plurality of pdf documents, each comprising a grid-less table;
  converting the plurality of pdf documents to html documents;
  identifying, in each of the html documents, a table tag associated to the grid-less table of the associated pdf document;
  determining, for each of the grid-less tables, a table grid image based at least in part on the corresponding identified table tag;
  obtaining, from each of said pdf documents, an image of the grid-less table; and
  dilating each of the obtained images of the grid-less tables.

According to a further preferred embodiment, the image of the grid-less table is obtained, from each of said provided pdf documents, by:

determining a bounding box for the grid-less table in each pdf document by means of the trained DLM; and extracting, from each of said pdf documents, an image of the grid-less table based on the determined corresponding bounding box.

Similarly, to DLM training data, the use of a mark-up language to obtain to table tags is easy to implement and provides qualitative information regarding positions of invisible grid of a grid-less table in an electronic document. From this invisible grid position information, a table grid image for the grid-less table is easily derived. Preferably, HTML, which is widely used, is used as mark-up language.

For determining the gridded image of the grid-less table, a simple embodiment of the present invention further provides: determining a table grid image for the processed extracted image by means of the trained GNN comprised by the trained cGAN; and combining the determined table grid image and the grid-less table from the provided fixed-layout electronic document in said gridded image. The table grid image and the grid-less table can be combined to obtain said gridded image using any technique known in the state of the art, such as image merging or superimposing one of the images on the other. The used technique may or may not depend on the file formats of the images used when implanting the present invention.

As is the case with any machine learning technique (MLT), quality of generated outputs greatly depends on the quality of the training data on which an MLT model is trained. In the case of the trained cGAN, lacking training data may or may not result in inadequate or corrupted determined table grid images. Combining such inadequate or corrupted determined table grid image and the grid-less table in a gridded image may or may not hamper processing and/or parsing. In order to improve quality of inadequate or corrupted determined table grid images, image restoration techniques known in the art can be used.

According to a preferred embodiment, the present invention further comprises the step of training an artificial neural network (ANN) on training data comprising training pairs, each comprising a training-related table grid image and corresponding corrupted table grid image. Preferably, wherein the ANN is an auto-encoder. According to the preferred embodiment, the present invention further comprises the step of determining a restored table grid image from the corrupted table grid image by means of the trained ANN comprised trained GNN determined table grid image. Preferably, wherein the determined restored table grid image and the grid-less table from the provided fixed-layout electronic document are combined in the gridded image of the grid-less table.

EXAMPLES

The invention is further described by the following non-limiting examples which further illustrate the invention, and are not intended to, nor should they be interpreted to, limit the scope of the invention.

Example 1: Document Parsing

The present example pertains to a general overview of a workflow according to the invention. Reference is made to FIG. 1.

FIG. 1 shows a schematic overview of an overall workflow of the invention. The workflow comprises the processing of grid-less tables and documents associated therewith. According to the present example, the provided fixed-layout electronic document (1) comprising a grid-less table is a PDF document (1') which is converted to an image file (1"). This image file is fed to a trained CNN (2). Training of said DLM is discussed in example 2. Using this trained CNN, an image of the grid-less table (3) is extracted, which is thereafter processed by at least performing a dilation step (4). Processing of the extracted image is discussed in example 4. The processed extracted image (5) is fed to a trained GNN comprised by a trained GAN (6). Training of said GAN (6) is discussed in example 3. Using the trained GNN, a table grid image (7) is determined for the processed extracted image. Thereafter, the table grid image is superimposed (8) on the extracted image of the grid-less table to obtain a gridded image of the grid-less table (9). This gridded image is fed to an OCR tool (10) to obtain tabular information in the grid-less table in a word-processable format (11).

Example 2: Training DLM

Figure 2:
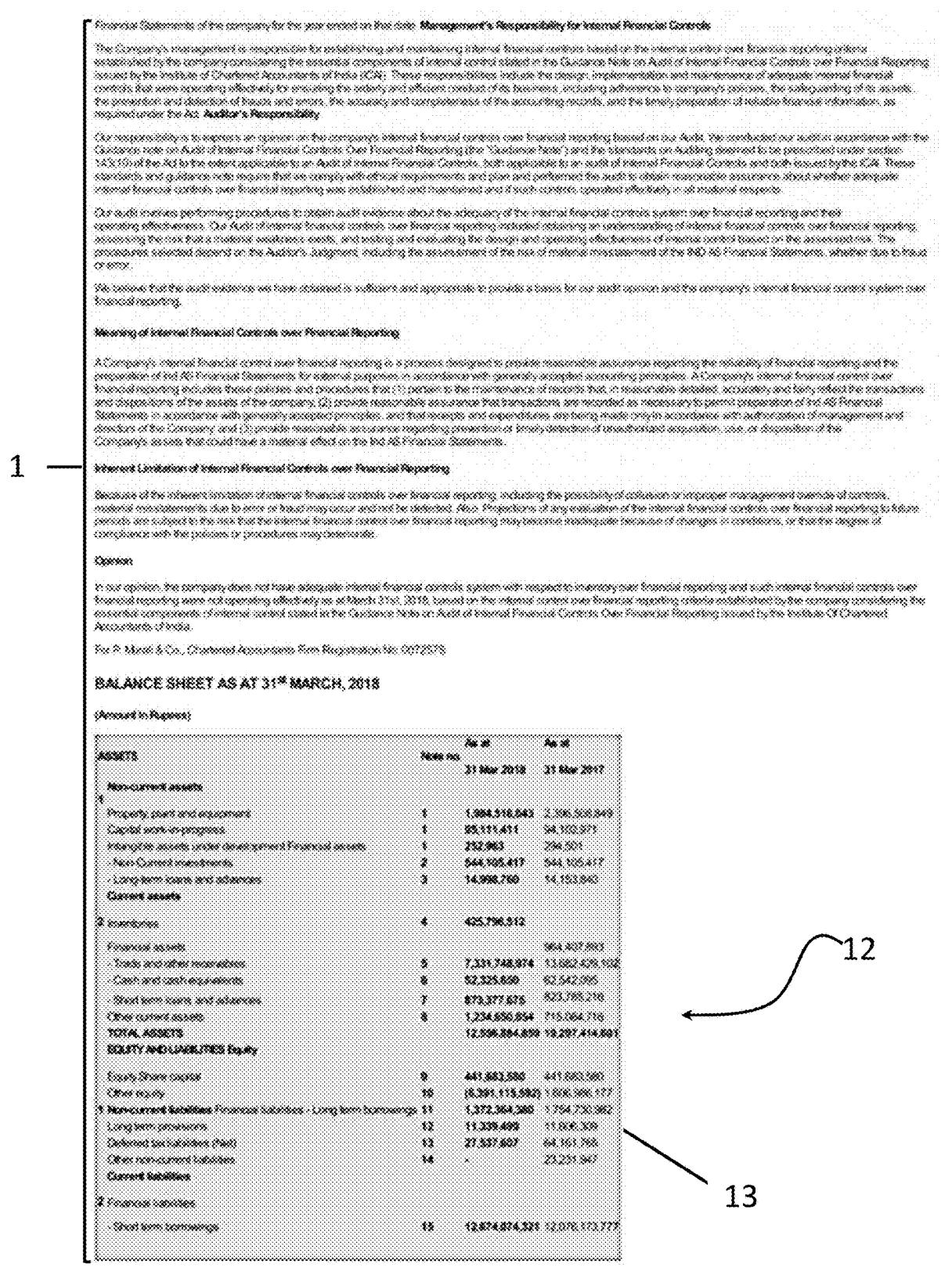
Figure 3:
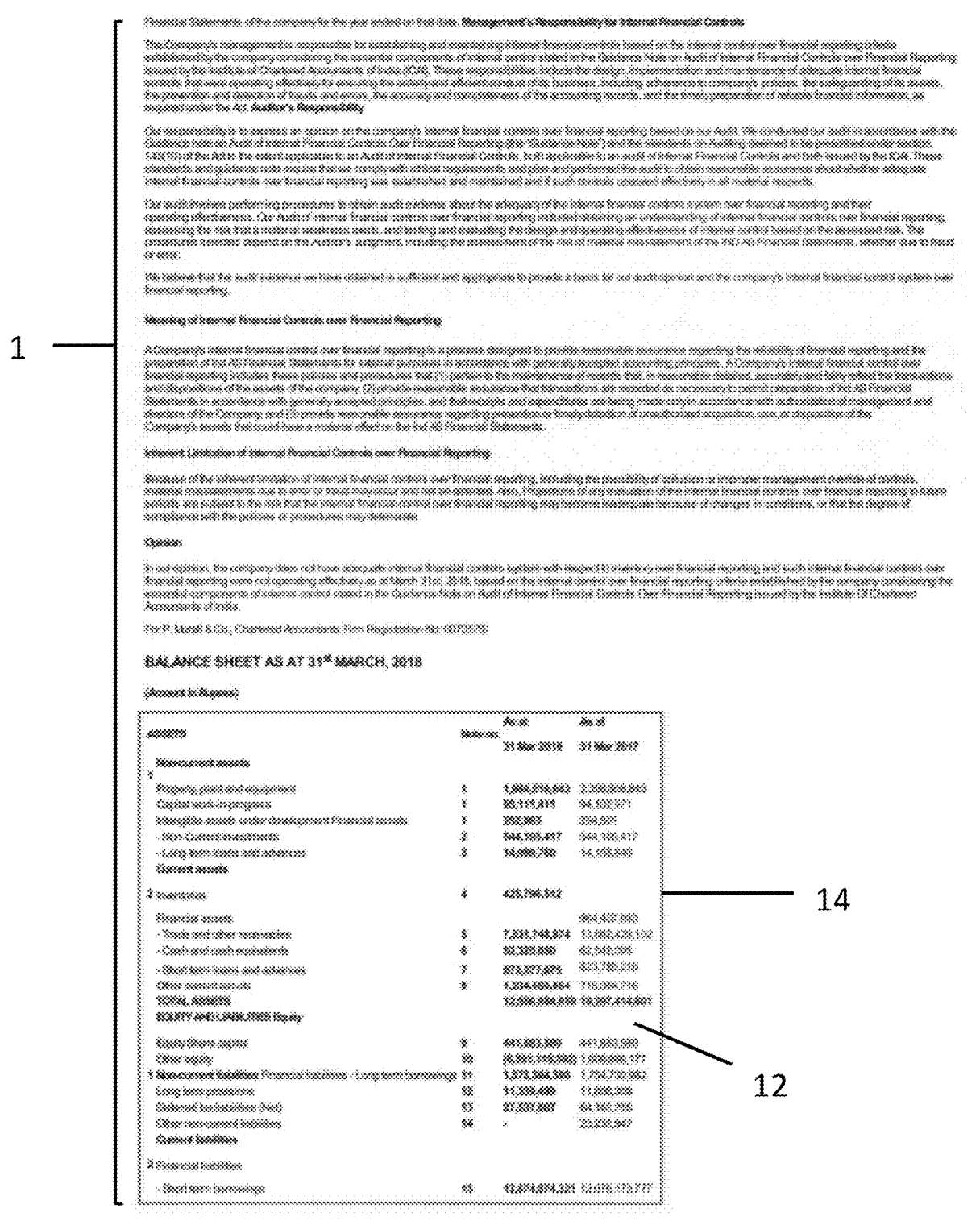
Figure 4:
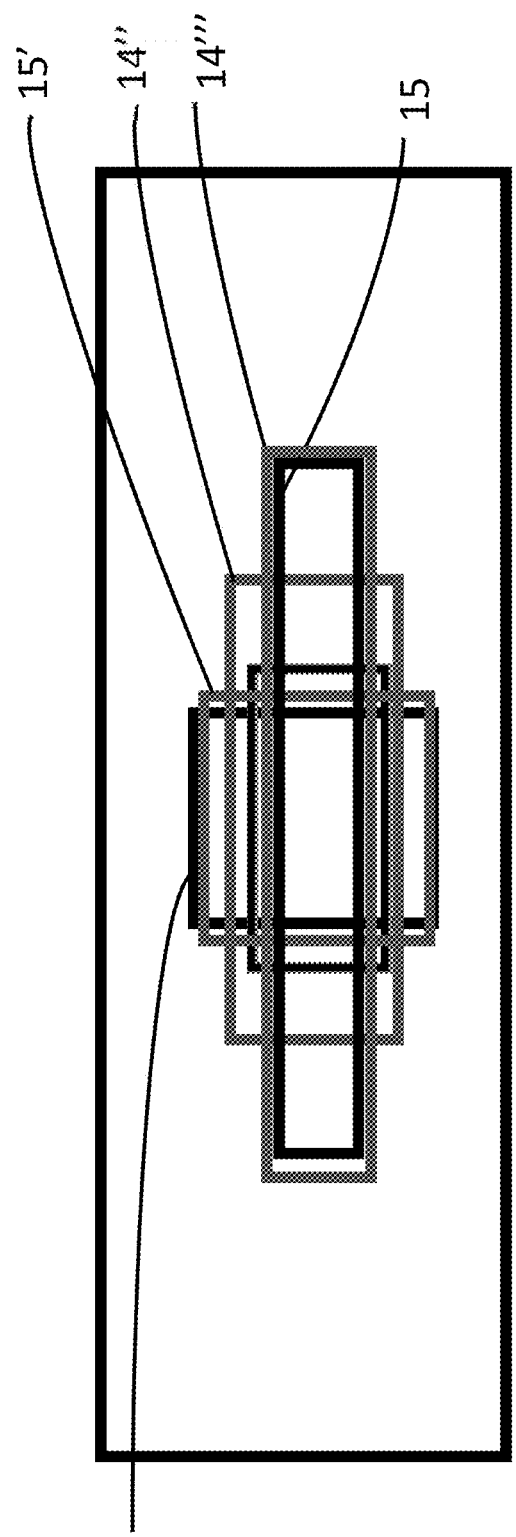

The present example pertains to training of a DLM, particularly a CNN. Reference is made to FIGS. 2 to 4.

FIGS. 2 and 3 illustrate obtaining training data for training the DLM. The training data relates to a plurality of training-related electronic documents (1), each comprising a grid-less training table (12) and a label (13) associated thereto indicative of a bounding box of the training table. By training the DLM on such training data, a bounding box (15) for a grid-less table (12) in said fixed-layout electronic document (1) can be determined by means of the trained DLM.

According to the present example, the DLM is a CNN, specifically based of the publicly available tool YOLO. YOLO is a powerful neural network that draws bounding boxes around detected objects within an image. Darknet is an open source framework which is used in training neural networks and serves as the basis for YOLO. In the present example, the YOLOV3 network is used to identify grid-less tables.

To train the YOLOV3 network, image-based PDF documents were first converted into HTML output. The HTML content was then scrapped and parsed for tables. The table tags, e.g. <td>, from the HTML source code were detected and painted. This is for example visible in FIG. 2, and allowed coordinates of the tables to be present in the PDF documents, thereby forming the training set that was fed into YOLOV3. From this information, x,y coordinates and height and width of the table were determined.

YOLOV3 uses IOU and BCE as a loss function and uses Logistic regression for object localization. IOU can be computed as Area of Intersection divided over Area of Union of two boxes. IOU must be ≥0 and ≤1. To be able to predict bounding boxes, IOU needs to be between the predicted bounding box and the ground truth bounding box which is approximately 1. The YOLOV3 network predicts four coordinates for each bounding box: tx; ty; tw; th. Presently, the cell is offset from the top left corner of the image by (cx, cy), and the bounding box prior has width and height Pw, Ph.

Predictions of the YOLOV3 network correspond to $b_x = \delta(t_x) + c_x$ $b_y = \delta(t_y) + c_y$ $b_w = p_w e^{t_w}$ $b_h = p_h e^{t_h}$ The loss function of the YOLOV3 network is shown below.

$$\lambda_{coord}\sum_{i=0}^{S^2}\sum_{j=0}^{B}\mathbb{1}_{ij}^{obj}\left[(x_i-\hat{x}_i)^2+(y_i-\hat{y}_i)^2\right]+$$

$$\lambda_{coord}\sum_{i=0}^{S^2}\sum_{j=0}^{B}\mathbb{1}_{ij}^{obj}\left[\left(\sqrt{w_i}-\sqrt{\hat{w}_i}\right)^2+\left(\sqrt{h_i}-\sqrt{\hat{h}_i}\right)^2\right]+\sum_{i=0}^{S^2}\sum_{j=0}^{B}\mathbb{1}_{ij}^{obj}(C_i-\hat{C}_i)^2+$$

$$\lambda_{noobj}\sum_{i=0}^{S^2}\sum_{j=0}^{B}\mathbb{1}_{ij}^{noob}(C_i-\hat{C}_i)^2+\sum_{i=0}^{S^2}\mathbb{1}_{ij}^{obj}\Sigma_{c\in classes}(p_i(c)-\hat{p}_i(c))^2$$

FIG. 4 illustrates localization prediction iterations for determining a bounding box of grid-less table in, for example, an image. During training, bounding box predictions (15', 15", 15"') are iteratively corrected until a difference to the ground truth (16) of the bounding box of the grid-less table meets a predicate.

Example 3: Training GAN

The present example pertains to training of a GAN, particularly a cGAN. Reference is made to FIGS. 5 to 10.

Figure 5:
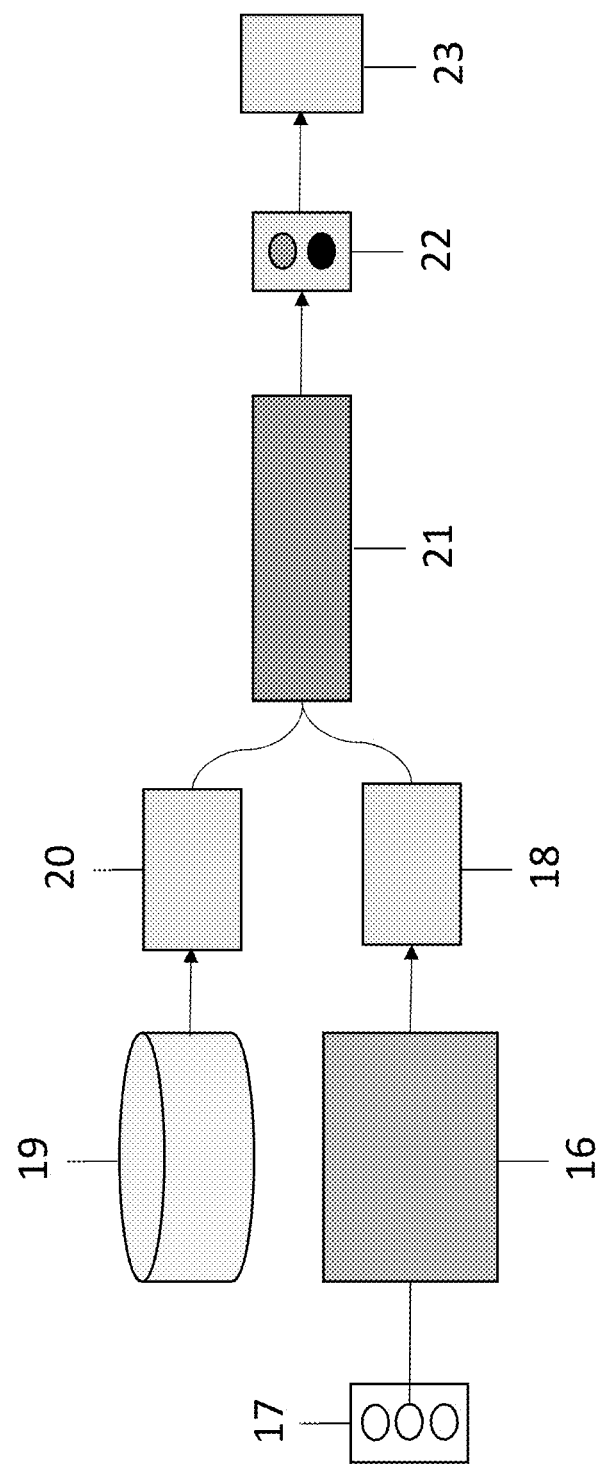

FIG. 5 illustrates a general overview of GAN architecture. A GAN is implemented by a system of two neural networks, i.e. GNN (14) and DNN (21), competing against each other in a zero-sum game framework. The two neural networks are created and learning is performed (i.e., the networks are trained) through their mutual competition. The first neural network is implemented as generator system, and is referred to as generator neural network (GNN). The second neural network is implemented as discriminator system, and is referred to as discriminator neural network (DNN). The GNN begins with a random input (17) and attempts to generate synthetic or fake images (18). The DNN receives real authentic images (19; 20), along with the synthetic images from the GNN. Accordingly, the DNN outputs a binary decision (22) indicating a prediction as to whether the image received from the GNN is real or fake. As the DNN improves at distinguishing between real image and synthetic images, the GNN improves at generating images to fool the DNN. The GNN is trained by minimizing a respective associated loss function. The loss function for the GNN is learned and not predefined. The DNN is trained by minimizing a respective associated loss function (23). The GNN and the DNN are iteratively trained by minimizing a respective associated loss function. Equilibrium is for example reached when the GNN can no longer fool the DNN. No domain knowledge needs to be explicitly included. Image features are learned automatically.

According to the present example, the GAN uses a PatchGAN architecture. The Binary Cross Entropy method was utilized as a loss function for the DNN. Furthermore, to train the model YOLOV3 output images (example 2) were simulated, thereby providing coordinate information on the grid-less table. These images are pre-processed to dilate using computer vision and passed to the DNN as real images, while GNN output images are passed as fake images. DNN trainable parameters are set as false and loss function used is Binary Cross Entropy. Finally, all of the images are fed to the GAN with loss set to Binary Cross Entropy and Mean Absolute Error. The GAN according to the present example is a cGAN, and is therefore conditioned on its input. The loss function of the entire GAN constitutes the generator loss and discriminator loss function. The discriminator reduces the real and generated image to patches and computes entropy loss over every patch. As a Patch GAN architecture is used in the present example, the entire GAN loss function corresponds to.

$$\max_G\min_D V(G,D)=E_{x\sim p_x}[\log D(x,y)]+E_{x\sim p_x}[\log(1-D(x,G(x,z)))]$$

Figure 6:
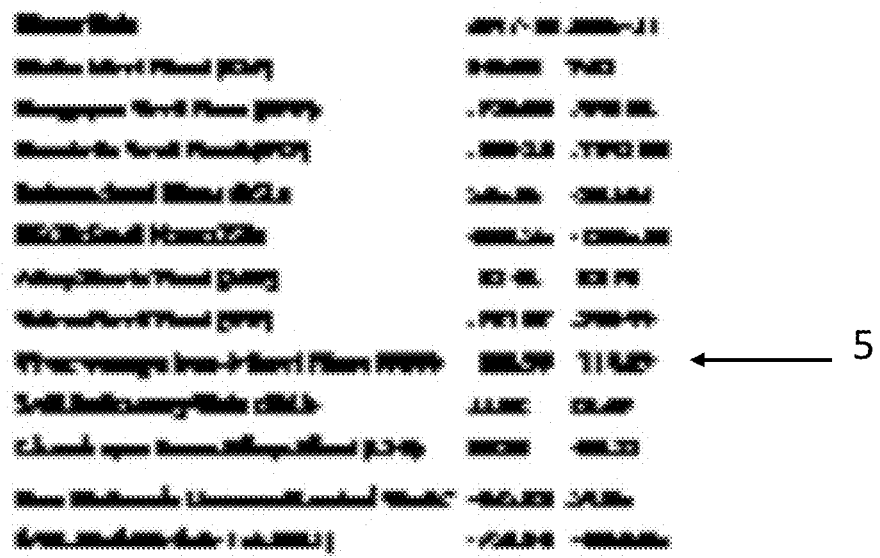
Figure 7:
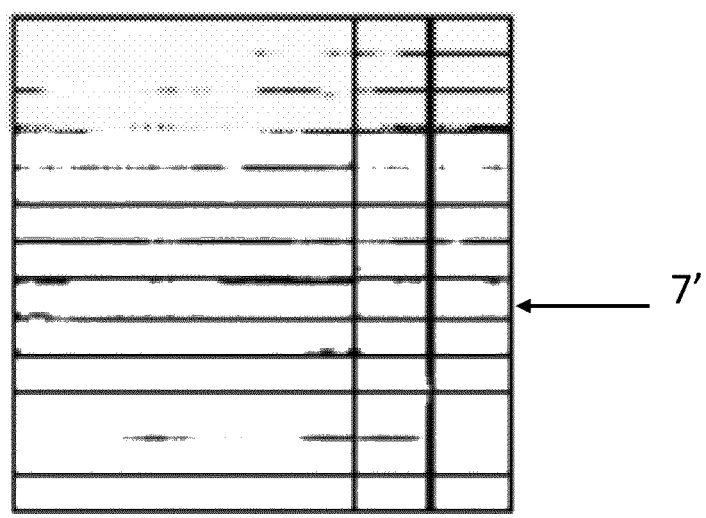
Figure 8:
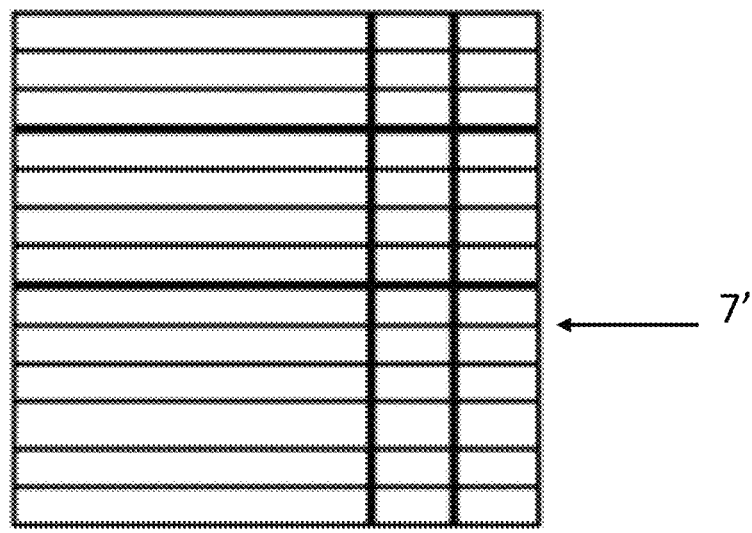
Figure 9:
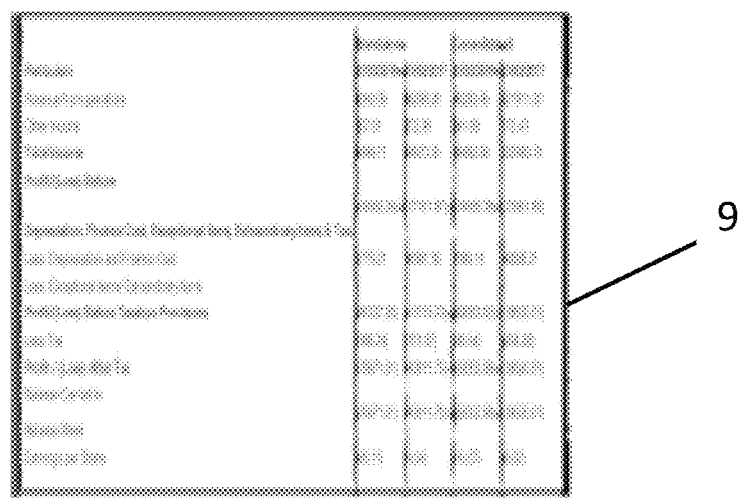
Figure 13:
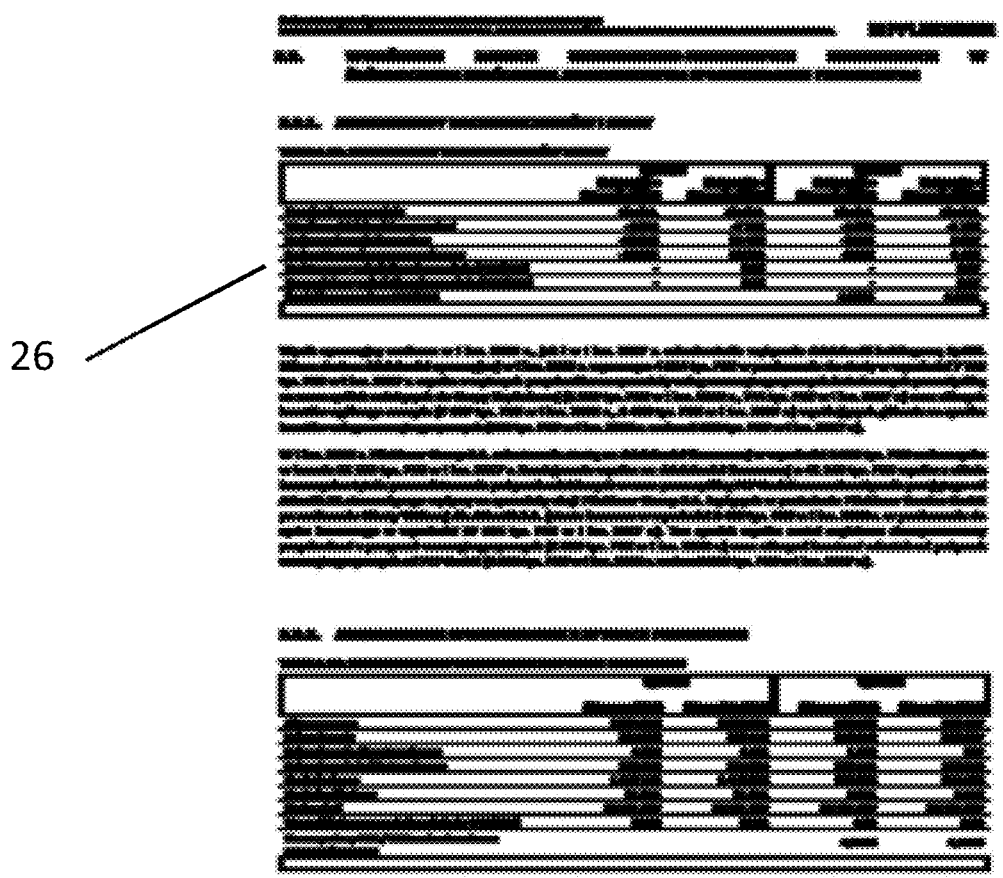
Figure 14:
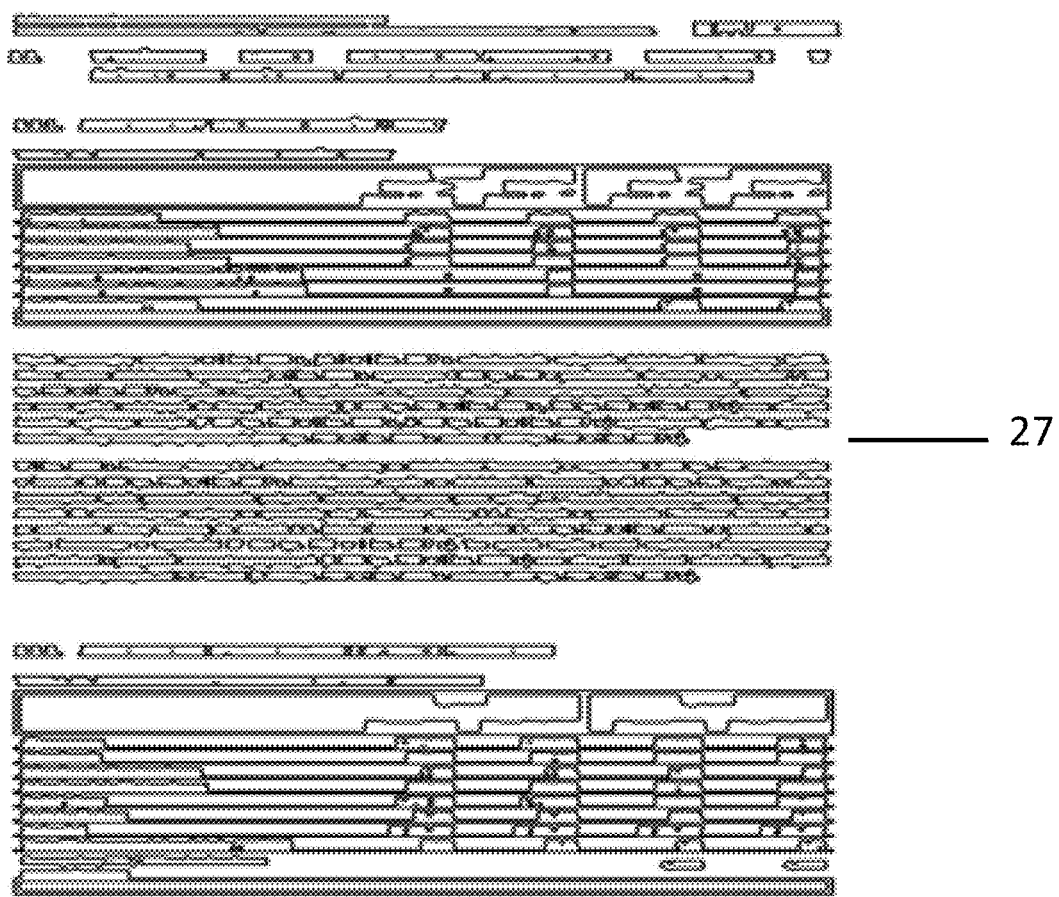
Figure 15:
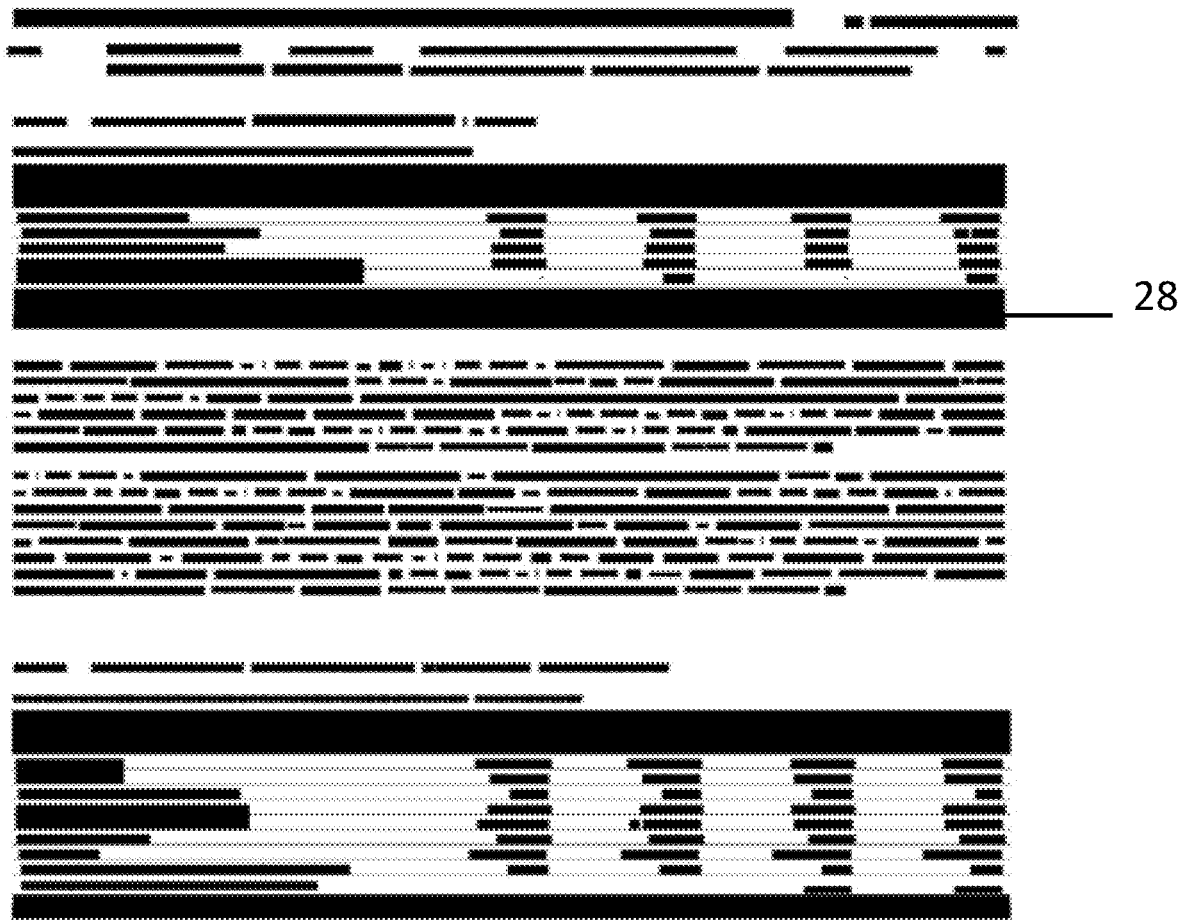

FIGS. 6 to 10 illustrate table grid prediction for an extracted grid-less table using the GAN. FIG. 6 shows the dilated image of the grid-less table (3). FIG. 7 shows the output of the GAN. This output constitutes a corrupted grid image (7'). This corrupted grid image can be restored us an image restoring technique. Thus, obtaining a restored table grid image (7"). Said restored table grid image can be superimposed with the restored table grid image, to obtain a gridded image (9) of the grid-less table. This gridded image can be parsed using OCR to obtain word-readable information (11) of the grid-less table.

Example 4: Image Dilation

The present example pertains to processing prior and after image dilation. Reference is made to FIGS. 11 to 15.

FIGS. 11 to 15 illustrate preferred image processing step prior and after dilation, for improving processing of grid-less tables. The original coloured image (24) is converted to a grayscale image. Post conversion, adaptive thresholding is applied on the grayscale image since no static threshold values are used and every document maintains a different font style, font size, indentation, calligraphy, etc. Thus, a thresholded greyscale image (25) is obtained. This image highlights table header font. Also, these steps aid in dynamically deducing the threshold of image pixels.

The thresholding value is calculated using weighted sum of neighbourhood values using a gaussian window. Next, the thresholded greyscale image is dilated and eroded. Thus, a dilated image of the thresholded greyscale image (26) is obtained. For erosion and dilation, we need two inputs, being an image and a structuring element. The structuring element is called a kernel. In dilation the kernel convolutes and performs max pooling, thereby expanding the area covered by the textual data. In erosion, the exact opposite operation is performed by kernel, that is to convolute and compute the min-pooling, which shrinks the textual data in appearance. After the dilation step, the outlines (27) are obtained of the dilated objects in the previous dilation step dilated image. Thereafter, dilation is applied to the outline comprising image, and the dilated outline comprising image is again thresholded to obtain a thresholded dilated outline comprising image (28).

It is supposed that the present invention is not restricted to any form of realization described previously and that some modifications can be added to the presented example of fabrication without reappraisal of the appended claims. Methods according to the present invention may be realized in many different ways without departing from the scope of the invention.

The invention claimed is:
1. Computer-implemented method for improved table processing, comprising the steps of:
   providing a fixed-layout electronic document comprising a grid less table;
   training a deep learning model (DLM) on training data relating to a plurality of training-related electronic documents, each comprising a grid-less training table and a label associated thereto indicative of a bounding box of the training table;

determining a second bounding box for the grid-less table in said fixed-layout electronic document by means of the trained DLM;

extracting an image of the grid-less table from said fixed-layout electronic document based on the determined bounding box; and processing the extracted image by at least performing a dilation step;

wherein the method further comprises the steps of:

training a conditional generative adversarial network (cGAN) comprising a generator neural network (GNN) and a discriminator neural network (DNN) on training data comprising a set of real pairs, each comprising a training-related dilated grid-less table image and corresponding table grid image, wherein training of the cGAN comprises a plurality of training steps, each comprising one of steps a) or b), and step c):

a) providing, to the DNN, a real pair obtained from the set of real pairs;

b) providing, to the DNN, a generated pair comprising a candidate fake grid image and a corresponding training-related dilated grid-less table image obtained from the set of real pairs, wherein the candidate fake grid image is obtained by modifying, by the GNN, the corresponding training-related dilated grid-less table image using a random data vector;

c) determining, by the DNN, an indication of whether the DNN provided the set of real pairs or the generated pair; wherein training of the cGAN comprises a plurality of GNN and DNN iterative training cycles, each comprising at least one of said plurality of training steps, wherein during each training cycle a respective GNN or DNN associated loss function is minimized until an associated stability cycle predicate is met and wherein the cGAN is trained by minimizing a combined loss of the GNN and DNN associated loss functions until a combined loss stability predicate is met;

determining a table grid image for the processed extracted image by means of the trained GNN comprised by the trained cGAN;

wherein the method further comprises the steps of:

training an artificial neural network (ANN) on training data comprising training pairs, each comprising a training-related table grid image and corresponding corrupted table grid image, wherein the ANN is an autoencoder; and determining a restored table grid image from the trained-GNN determined table grid image via the trained ANN;

wherein the determined restored table grid image and the grid-less table from the provided fixed-layout electronic document are combined in a gridded image of the grid-less table;

wherein the method further comprises a step of feeding the gridded image to an OCR tool to obtain tabular information in the grid-less table in a word-processable format and generating a parsed document from the fixed-layout electronic document.

2. The method according to claim 1, wherein processing the extracted image further comprises, prior to said dilation step, the steps of:

converting the extracted image into a greyscale image; and applying thresholding to the greyscale image by means of an adaptive Gaussian technique;

wherein said dilation step is performed on said thresholded greyscale image.

3. The method according to claim 1, wherein processing the extracted image further comprises, after said dilation step, the steps of:

obtaining outlines of dilated objects in the by said dilation step associated with-the a dilated image;

dilating the outlines comprising the dilated image; and applying thresholding to the dilated outlines comprising the dilated image by means of an adaptive Gaussian technique.

4. The method according to claim 1 wherein processing the extracted image further comprises, prior to said dilation step, the steps of:

converting the extracted image into a greyscale image; and applying thresholding to the greyscale image by means of an adaptive Gaussian technique;

wherein said dilation step is performed on said thresholded greyscale image; and, wherein processing the extracted image further comprises, after said dilation step, the steps of:

obtaining outlines of dilated objects in the by said dilation step dilated image;

dilating the outlines comprising the dilated image; and applying thresholding to the dilated outline comprising the dilated image by means of the adaptive Gaussian technique.

5. The method according to claim 1, wherein processing the extracted image comprises, after said dilation step, an erosion step.

6. The method according to claim 1, wherein the set of real pairs, each comprising a training-related dilated grid-less table image and corresponding table grid image, are obtained by:

providing a plurality of PDF documents, each comprising a grid-less table;

converting the plurality of PDF documents to HTML documents; identifying, in each of the HTML documents, a table tag associated to a grid-less table of the associated PDF document;

determining, for the grid-less table, a table grid image based at least in part on a corresponding identified table tag; obtaining, from each of said PDF documents, an image of the grid less table; and dilating each of the obtained images of the grid-less table.

7. The method according to claim 6, wherein the image of the grid-less table is obtained, from each of said provided PDF documents, by:

determining a third bounding box for the grid-less table in each PDF document by means of the trained DLM; and extracting, from each of said PDF documents, an image of the grid-less table based on the determined corresponding bounding box.

8. The method according to claim 1, wherein the plurality of PDF documents, each comprising a grid-less training table and a label associated thereto indicative of a fourth bounding box of the training table, are obtained by:

providing a plurality of PDF documents, each comprising a grid-less table;

converting the plurality of PDF documents to the HTML documents;

identifying, in each of the HTML documents, a table tag associated with a grid-less table of the associated PDF document; and associating a label, to each of the plurality of PDF documents, for the fourth bounding box of the grid-less table, wherein said label is based at least in part on a corresponding identified table tag.

9. The method according to claim 1, wherein the DLM is one or more of an artificial neural network (ANN), a recurrent neural network (RNN) or a convolutional neural network (CNN).

10. The method according to claim 1, wherein the DLM is a convolutional neural network (CNN).

11. A computer system for improved table processing, the computer system configured for performing the computer-implemented method according to claim 1.

12. A non-transitory computer readable medium for improved table processing, the non-transitory computer readable medium comprising instructions which, when the non-transitory computer readable medium is executed by a computer, cause the computer to carry out the computer-implemented method according to claim 1.

13. The non-transitory computer readable medium of claim 12, wherein the instructions further cause the computer to generate a parsed document from the fixed-layout electronic document.

* * * * *